(No Model.)
J. SEIBEL.
THILL COUPLING.
No. 556,441. Patented Mar. 17, 1896.
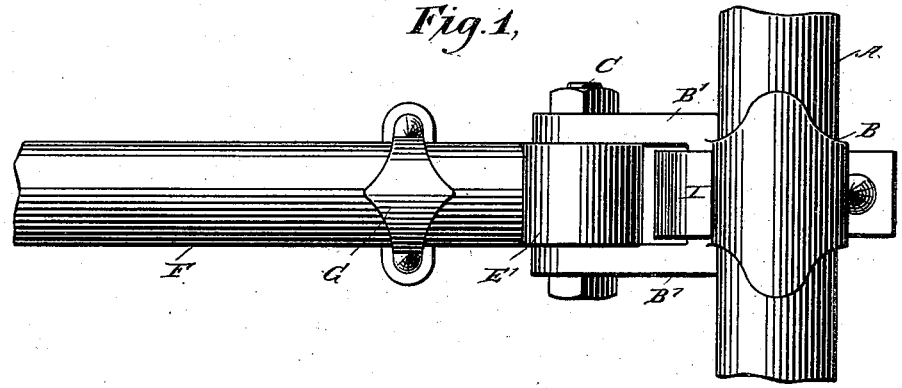
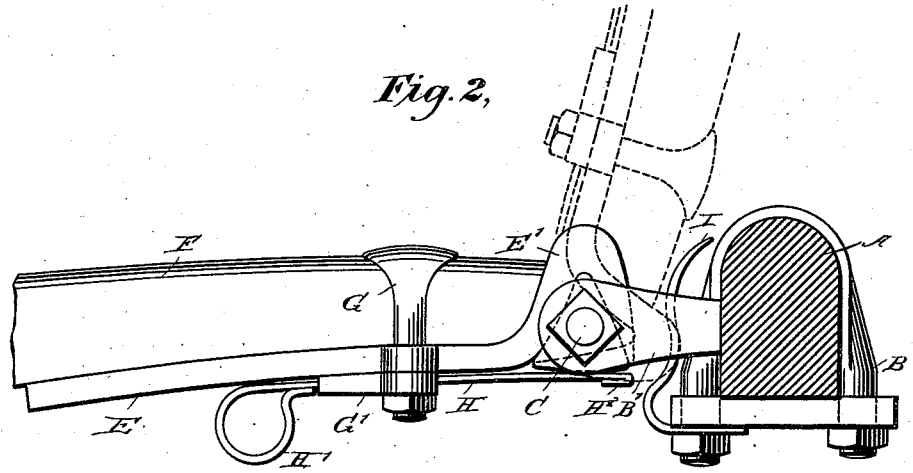
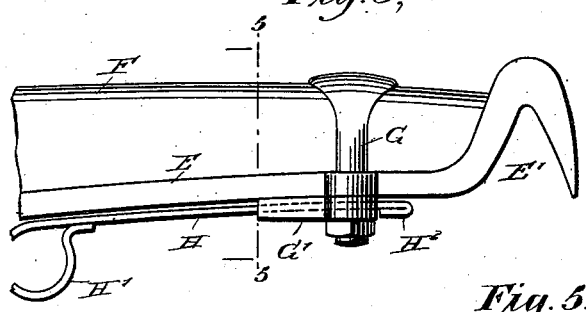
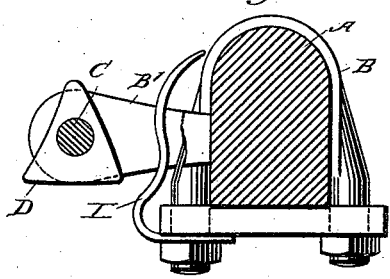
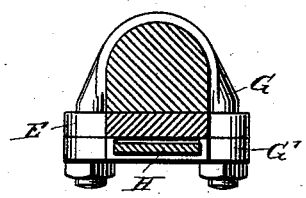
WITNESSES:
Edward Thorpe
Rev. G. Hostin
INVENTOR
J. Seibel
BY Munn & Co
ATTORNEYS.

United States Patent Office.

JOSEPH SEIBEL, OF ONTONAGON, MICHIGAN.

THILL-COUPLING.

SPECIFICATION forming part of Letters Patent No. 556,441, dated March 17, 1896.

Application filed June 10, 1895. Serial No. 552,338. (No model.)

*To all whom it may concern:*

Be it known that I, JOSEPH SEIBEL, of Ontonagon, in the county of Ontonagon and State of Michigan, have invented a new and Improved Thill-Coupling, of which the following is a full, clear, and exact description.

The object of the invention is to provide a new and improved thill-coupling which is simple and durable in construction and arranged to permit of quickly, conveniently, and securely connecting the shafts to the axle or removing them therefrom.

The invention consists principally of a hook on the shaft engaging a pivot-pin, and a bolt held to slide on the shaft and adapted to close the hook on the pin. The invention further consists of a block mounted to turn on a fixed pivot and adapted to be engaged by the shaft.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a plan view of the improvement. Fig. 2 is a side elevation of the same. Fig. 3 is a side elevation of one of the shafts detached. Fig. 4 is a sectional side elevation of the pivot-pin and clip supporting the same from the axle, and Fig. 5 is a transverse section of the shaft on the line 5 5 of Fig. 3.

The axle A is provided with the usual clip B, having the forwardly-extending lugs B' supporting a pivot-pin or bolt C on which is mounted to turn loosely a block D, preferably made triangular in cross-section, as plainly indicated in Fig. 4. Upon the two sides of this block D is adapted to hook an inverted-V-shaped hook E' on the shaft-iron E attached to the vehicle-shaft F in the usual manner by a clip G.

On the clip-plate of the clip G is formed a guideway G' in which is fitted to slide a spring-bolt H, formed at its inner end with a handle H' and at its outer end with a doubled-up portion or lug H² to prevent the bolt from being drawn out of the guideway G'. The forward end of the bolt H is adapted to be pushed outwardly by the operator after the hook E' is hooked upon the block D, so that the forward end of the said bolt closes the lower open end of the hook E' on the under side or base of the block D. (See Fig. 2.) Now it will be seen that when the bolt H is in an open position, as shown in Fig. 3, the hook E' can be conveniently attached to or detached from the block D, and when the said hook is engaged with the block and it is desired to lock the shaft in place then the operator takes hold of the handle H' and pushes the bolt H forward over the somewhat projecting base of the block D to securely hold the hook E' on the block D, as indicated in Fig. 2. Now as the block D is loose on the pivot-pin C the shaft can freely swing, with the said pivot as the fulcrum.

A spring I is attached to the clip-plate of the clip B to engage the top of the hook E' whenever the shafts F are swung into an uppermost position, so as to securely hold the shafts in a folded position.

By the arrangement described the shafts can be readily attached or detached from the axle whenever it is desired.

Having thus fully described my invention, I claim as new and desire to secure by Letters Patent—

1. A thill, comprising a clip adapted to be secured to the axle, a block rotatably held in the clip, a hook carried by the thill and embracing the block, a clip on the thill and having a passage extending longitudinally therewith, and a bolt slidable through the passage of the clip and capable of holding the block in the hook, substantially as described.

2. A thill-coupling, comprising a clip adapted to be secured to the axle and having two forwardly-projecting arms, an angular block rotatably mounted in said arms, a correspondingly-shaped hook carried by the thill and embracing the block, a clip embracing the thill and holding said hook, and a bolt slidably mounted in said clip and lying alongside of the hook and capable of holding the same engaged with the block, substantially as described.

JOSEPH SEIBEL.

Witnesses:
W. WORTH WENDELL,
THOS. N. CARMICHAEL.